INVENTOR
A.M. GORDON
BY R. B. Ardis
ATTORNEY

United States Patent Office 3,346,746

Patented Oct. 10, 1967

3,346,746

MONOSTABLE MULTIVIBRATOR CIRCUIT HAVING VARIABLE TIMING INTERVAL

Alan M. Gordon, Matawan Township, Monmouth County, N.J., assignor to Bell Telephone Laboratories, Incorporated, New York, N.Y., a corporation of New York Filed Oct. 20, 1965, Ser. No. 498,413
6 Claims. (Cl. 307—88.5)

This invention relates to monostable multivibrator circuits and, more specifically, to monostable multivibrator circuits having a quasi-stable state of variable duration.

A monostable multivibrator circuit has one stable state and one quasi-stable state. Upon the application of an input trigger a monostable multivibrator circuit commences its quasi-stable state and returns to its stable state after a predetermined tiem interval has elapsed. The duration of the quasi-stable state is determined by the discharge characteristic of the multivibrator timing impedance. In one such monostable multivibrator circuit a resistor-capacitor network comprises such timing impedance and the discharge characteristic of this resistor-capacitor combination controls the duration of the quasi-stable state.

In certain circuit applications it is necessary to provide output pulses whose duration is variable as a function of particular external circuit conditions. Monostable multivibrators, having resistor-capacitor timing impedances, lend themselves particularly well to such an application.

The primary object of the invention is to vary the duration of the quasi-stable state of a monostable multivibrator.

Another object of the invention is to provide remote control of the duration of the quasi-stable state of a monostable multivibrator.

To fulfiill these objects, the invention varies the discharge characteristic of the timing impedance of a monostable multivibrator by selectively shorting out portions of the timing impedance.

More specifically, one embodiment of the invention comprises a monstable multivibrator circuit having a variable resistor-capacitor timing impedance, a pluarlity of input gates, and an OR-gate. Input pulses activate particular input gates as a function of specific external circuit conditions to selectively short out respective resistors of the timing impedance. The output pulses of the gates are simultaneously applied through an OR-gate to the trigger input of the monostable multivibrator, to trigger the monostable multivibrator from its stable state to its quasi-stable state. The gate output pulses therefore start each quasi-stable state and also control its duration, since that duration is a direct function of the total resistance of the timing impedance.

The present invention, therefore, provides for a monostable multivibrator circuit having variable timing intervals in which specific, predetermined timing intervals may be remotely and automatically selected by means of gating circuits which activate the monostable multivibrator.

The above and other features of the invention will be more fully understood from the following detailed description considered in conjunction with the drawings, in which.

Figure 1:
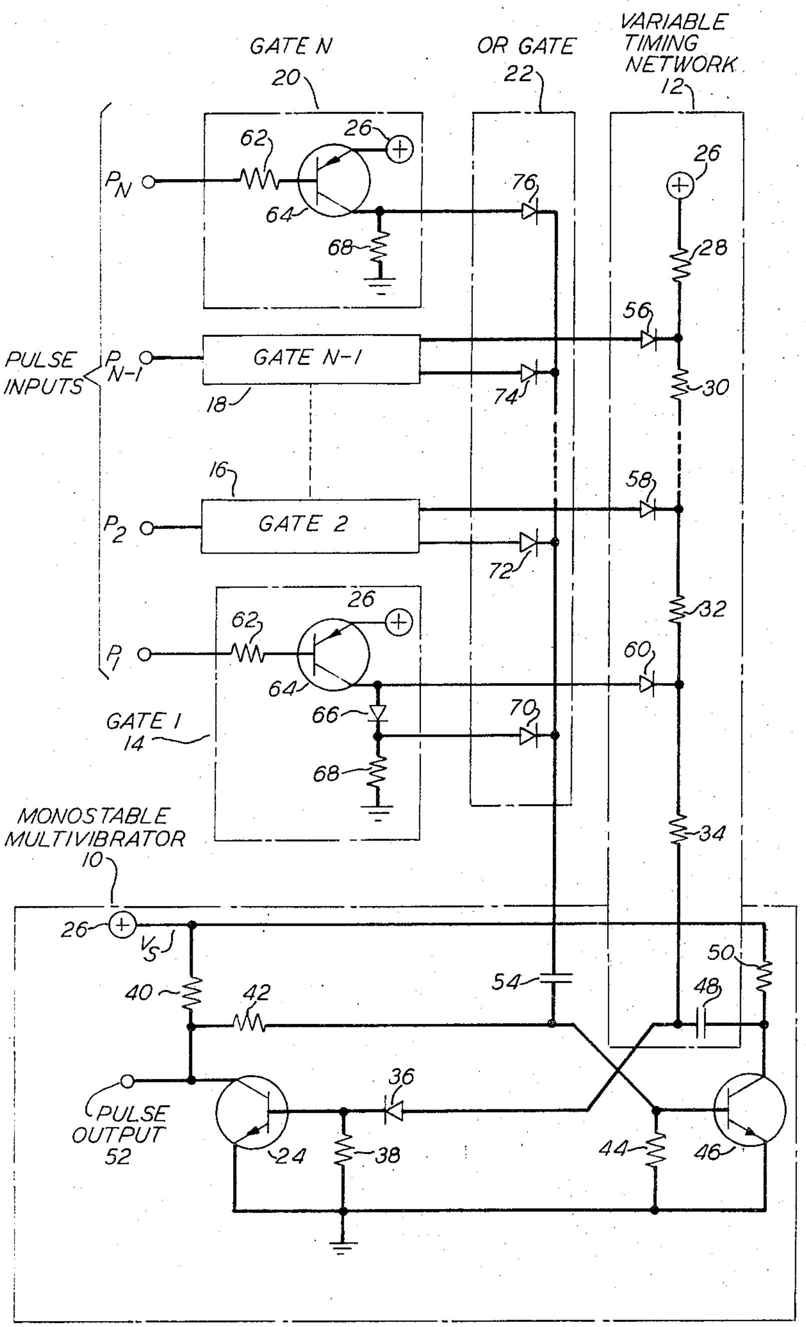
FIG. 1 is a schematic of a specific embodiment of the invention.

In FIG. 1 a pulse generator is shown comprising a monostable multivibrator circuit 10 having a variable timing network 12, input gates 14, 16, 18, and 20 furnishing inputs to OR-gate 22 as well as to variable timing network 12. In addition, means for applying negative input pulses $P_1$ through $P_n$ to gates 1 through *n*, respectively, are included.

Monostable multivibrator circuit 10 functions in the manner of a conventional monostable multivibrator. In the absence of any input pulses $P_1$ through $P_n$, transistor 24 is held on (i.e., in its conducting state) by current supplied from voltage source 26 through resistors 28, 30, 32, 34, diode 36, and resistor 38. Conduction of transistor 24 through resistor 40 establishes a low potential at its collector. This low potential is coupled via resistors 42 and 44 to the base of transistor 46, thus holding transistor 46 turned off (i.e., in its nonconducting state). As a result, capacitor 48 is charged through load resistor 50 of transistor 46 approximately to the supply voltage $V_s$. The potential at pulse output 52 during this stable state of the multivibrator is held to the saturation voltage of transistor 24.

A positive going pulse is applied to capacitor 54 in order to commence a quasi-stable state of the monostable multivibrator. This pulse is differentiated through the combined action of capacitor 54 and resistor 44, generating a positive trigger pulse which is applied to the base of transistor 46, thereby turning on transistor 46. The resulting low potential on the collector of transistor 46 causes the potential stored on capacitor 48 to reverse bias transistor 24 at that same instant, thereby turning off transistor 24 and generating a positive step voltage at pulse output 52.

Immediately after this switching action, capacitor 48 starts to charge to $+V_s$ through resistors 28, 30, 32, 34, and through saturated transistor 46. When the capacitor has charged to such a voltage that the base of transistor 24 is again slightly forward biased, transistor 24 collector current starts to flow, reducing the collector voltage of transistor 24. The output voltage at pulse output 52 consequently decreases again to approximately zero, and the voltage decrease is coupled through resistor 42 to the base of transistor 46, turning off transistor 46.

A positive output pulse is thus generated at pulse output 52, the output pulse being initiated by a trigger pulse applied to capacitor 54 and having a duration determined by the composite time constant of variable timing network 12. It is therefore feasible to vary the duration of the output pulse of monostable multivibrator 10 by varying the time constant of its timing impedance. The instant invention provides for a variation by means of variable timing network 12 and the associated gating circuits.

Variable timing network 12 comprises capacitor 48, resistors 28, 30, 32, and 34, and diodes 56, 58, and 60. With a positive voltage of an amplitude equal to $V_s$ applied to diode 60, for example, resistor 34 and capacitor 48 determine the duration of the output pulse, since resistors 28, 30, and 32 are effectively shorted out. If, however, the positive voltage is applied to diode 56 instead, only resistor 28 is shorted out and the total resistance of series resistors 30, 32, and 34 comprises the resistive component of the timing impedance, thereby lengthening the duration of the pulse output.

The specific embodiment of the invention schematically represented in FIG. 1 provides for four distinct durations of the quasi-stable state of the monostable multivibrator. However, the invention is not limited to these specific durations. Any number of different durations may be provided for by changing to the appropriate number of resistors and respective diodes of variable timing network 12 and by including the required number of input gates.

In order to facilitate automatic variation for *n* different durations of the monostable multivibrator circuit output, the instant invention incorporates OR-gate 22 and input gates 1 through *n*, designated by reference numerals 14, 16, 18, and 20, respectively. Negative input pulses $P_1$ through $P_n$, of sufficient amplitude to drive the corresponding input gate transistors into saturation, are applied to the respective inputs of gates 1 through $n$. An input pulse to a respective gate is applied through resistor 62 to the base of transistor 64, thereby saturating transistor 64. As a result a voltage approximately equal to $+V_s$ is developed at the collector of transistor 64.

Each of the gates 1 through $n$–1, designated by numerals 14, 16, and 18, have two output voltages available, one of which it taken from the junction of the collector of transistor 64 and the anode of diode 66 and is applied to the anode of one of the corresponding diodes, 60, 58, and 56, respectively, of variable timing network 12. The second output of each of gates 1 through $n$–1 and the only output of $n$th gate 20 is taken from across resistor 68 and applied to the anodes of diodes 70, 72, 74, and 76, respectively, of OR-gate 22. The output of OR-gate 22, in turn, is applied to capacitor 54 of the trigger input of monostable multivibrator 10 to facilitate the start of a respective one of the quasi-stable states of monostable multivibrator 10. Feedback into gates 14, 16, 18, and 20 of the positive pulses applied to the resistors of the variable timing network 12 is prevented by diodes 56, 58, and 60. OR-gate 22 allows the application to capacitor 54 of a pulse derived from any one of the input gates, yet prevents its feedback into any of the nonactive gates.

At the beginning of each quasi-stable state of monostable multivibrator 10, at which time transistor 46 commences conduction, the junction point between capacitor 48, diode 36, and resistor 34 assumes a negative potential of an amplitude approximately equal to that of $V_s$. During the timing cycle this negative potential changes in an exponential fashion to a positive value. However, during the period that this point remains negative, diode 36 functions to protect transistor 24 from an excessive reverse base-emitter voltage. During that same period diode 66 of the respective input gate prevents the discharge of capacitor 48 through resistor 68 of the respective input gate via the corresponding resistors and diodes of variable timing network 12.

The pulse generator therefore functions to automatically select and simultaneously start a specific duration of the quasi-stable state of the monostable multivibrator.

Figure 2:
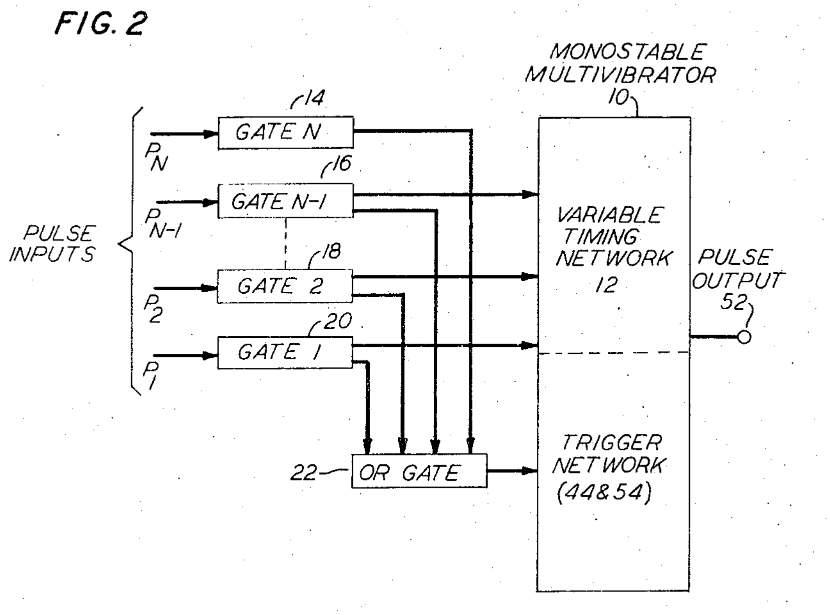
FIG. 2 is a block diagram of the embodiment of FIG. 1.

FIG. 2 is a block diagram of the transistor trigger circuit of the instant invention. Identical numerical designations as chosen for FIG. 1 have been assigned. Pulse inputs $P_1$ through $P_n$ are inverted in the corresponding input gates 1 through $n$. One output of each gate is directed to OR-gate 22 to furnish the starting trigger for the trigger network of monostable multivibrator 10. A second output of input gates 1 through $n$–1 is applied to variable timing network 12 to short out a respective portion of the timing impedance and thereby effect the desired duration of the quasi-stable state of the monostable multivibrator circuit.

Figure 3:
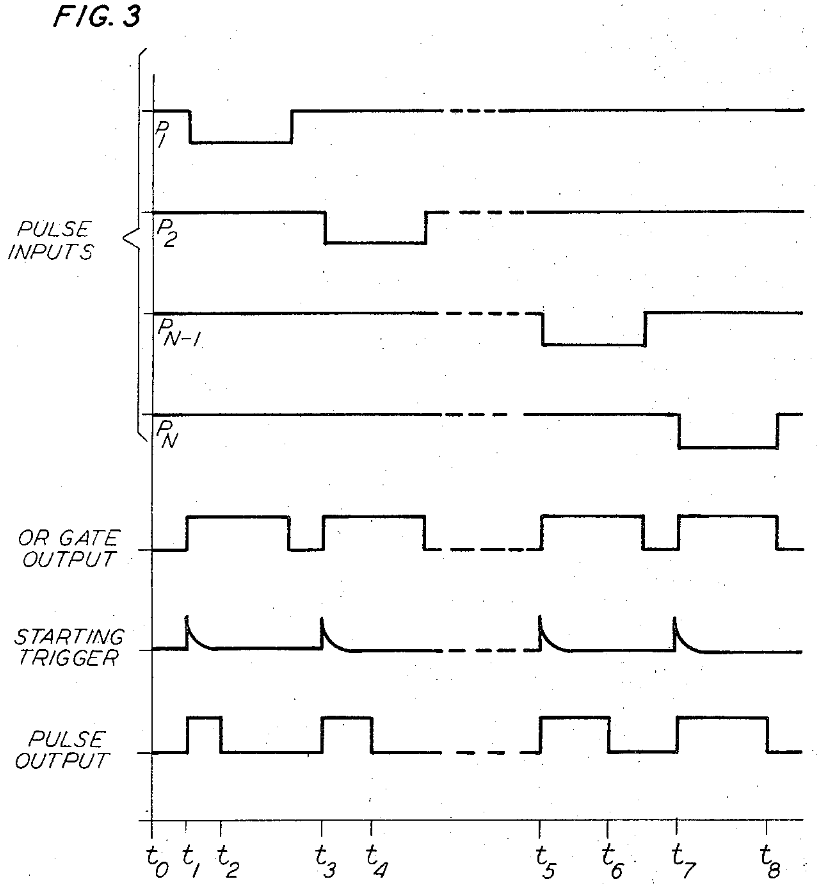
FIG. 3 shows waveforms illustrating the operation of the embodiment of FIG. 1.

FIG. 3 shows waveforms illustrating the operation of the embodiment of the invention of FIGS. 1 and 2. Pulses $P_1$ through $P_n$ are a series of negative pulses which are applied to the respective input gates. The OR-gate output comprises one positive pulse each for each input pulse $P_1$ through $P_n$. The starting trigger is generated in the trigger network of the monostable multivibrator from the leading edge of the series of OR-gate output pulses. Each starting trigger in turn triggers the monostable multivibrator to commence an output pulse of a different duration as shown, where the duration of the output pulse cannot, however, be greater than the duration of the corresponding input pulse. Pulse inputs $P_1$ through $P_n$ need, of course, not be applied in the order as shown in FIG. 3, but may be used in a random order strictly depending upon the specific circuit requirements.

It is to be understood that the above-described arrangements are illustrative of the application of the principles of the invention. Numerous other arrangements may be devised by those skilled in the art without departing from the spirit and scope of the invention.

What is claimed is:

1. A generator of variable duration pulses which comprises a monostable multivibrator having a stable state, a quasi-stable state, a trigger input, and a timing impedance for fixing the duration of said quasi-stable state, means to generate input pulses, said input pulses being routed to said trigger input to trigger said multivibrator from its stable state to its quasi-stable state, and means responsive to said pulses to selectively short out respectively different portions of said timing impedance, whereby the duration of each pulse generated by said multivibrator is dependent upon which portion of said timing impedance is shorted out.

2. The generator according to claim 1 in which said means to generate input pulses comprises a plurality of gates, each of said gates being connected to said trigger input to trigger said multivibrator from its stable state to its quasi-stable state, and all but one of said gates being connected to said timing impedance to short out a respectively different portion of said timing impedance, and a means to selectively activate each of said gates, whereby the duration of each pulse generated by said multivibrator is dependent upon which of said gates is activated.

3. The generator according to claim 2 in which said monostable multivibrator includes a first and a second transistor each having an emitter electrode, a base electrode, and a collector electrode, a potential source for supplying energy to said transistors, a first cross-coupling path between said collector electrode of said first transistor and said base electrode of said second transistor, a second cross-coupling path comprising a first capacitor connected between said base electrode of said first transistor and said collector electrode of said second transistor, and a second capacitor connected between said base electrode of said second transistor and said trigger input, said timing impedance comprising said first capacitor, a plurality of serially connected resistors, and a plurality of diodes, said serially connected resistors having two end terminals and a plurality of intermediate terminals, one of said intermediate terminals located at each junction of two of said resistors, said one end terminal being connected to said base electrode of said first transistor, said other end terminal being connected to said potential source thereby forward biasing said first transistor, one diode each of said plurality of diodes having its cathode individually connected to one of said intermediate terminals, and all but one of said gates being individually connected to the anode of a respective one of said diodes.

4. The generator according to claim 3 including an $n$th gate having an input and a first output point, $n$–1 gates each having an input and a first and a second output point, said timing impedance comprising $n$ series resistors and $n$–1 diodes, and one OR-gate having $n$ inputs and one output point, said means to selectively activate each of said gates being connected to the respective input of each of said gates, said gates generating at said respective first and second output points corresponding output pulses, one each of said output pulses from said second output point of a respective gate being individually coupled to the anode of a respective one of said diodes of said timing impedance, one each of said pulses from said first output point of a respective gate being coupled to a respective one of said inputs of said OR-gate, and said OR-gate output being coupled to said trigger input of said monostable multivibrator.

5. The generator according to claim 4 in which said $n$th gate circuit comprises a transistor having an emitter electrode, a base electrode, and a collector electrode, and a first and a second resistor, said emitter electrode being connected to one point of fixed potential of said potential source thereby supplying energy to said transistor, said first resistor being connected between said input of said gate circuit and said base electrode, said second resistor being connected between another point of fixed potential of said potential source and said collector electrode, said collector electrode being additionally connected to said first output point of said gate circuit, said $n$–1 gate circuits each comprising in addition to all of the components of the otherwise identical circuit arrangement of said $n$th gate circuit one diode each, said diode being connected between the junction point of said collector electrode and said first output point and said second resistor, the anode of said diode being connected to the junction point of said collector electrode and said first output point, the cathode of said diode being connected to said second resistor, the junction point of said second resistor and said cathode being connected, to said second output point, said OR-gate comprising $n$ diodes, each of the cathodes of said diodes being connected to said one output point of said OR-gate, and each one of said diodes having its anode individually connected to a respective one of said input points of said OR-gate.

6. The generator according to claim 5 in which said means to activate each of said gates generates a series of $n$ input pulses, the duration of each of said input pulses being at least as long as the duration of the respective quasi-stable state of said monostable multivibrator circuit, and in which the leading edge of each following input pulse shall be delayed from the termination of a preceding input pulse a sufficient time interval to allow said timing network to reach equilibrium between said successive input pulses.

References Cited

UNITED STATES PATENTS

| | | | |
|---|---|---|---|
| 2,562,660 | 12/1943 | Chance. | |
| 2,722,602 | 3/1951 | Pawley. | |
| 2,827,574 | 8/1953 | Schneider. | |
| 3,045,187 | 7/1962 | Belcastro | 328—207 |
| 3,067,343 | 12/1962 | Roscoe. | |
| 3,187,201 | 6/1965 | Eastman et al. | 307—88.5 |
| 3,263,223 | 7/1966 | Zenzefilis | 307—88.5 XR |

ARTHUR GAUSS, *Primary Examiner.*

J. A. JORDAN, *Assistant Examiner.*